April 3, 1928. 1,664,789
K. VON MEYENBURG
MOTOR TILLING MACHINE
Filed Dec. 1, 1925
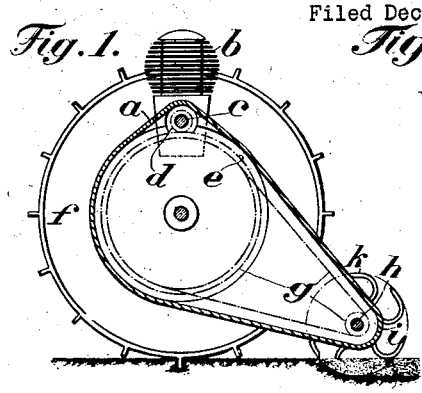
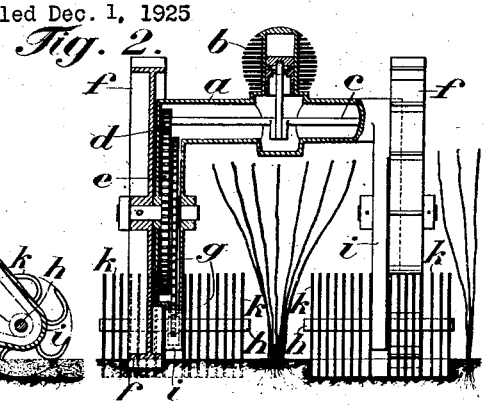
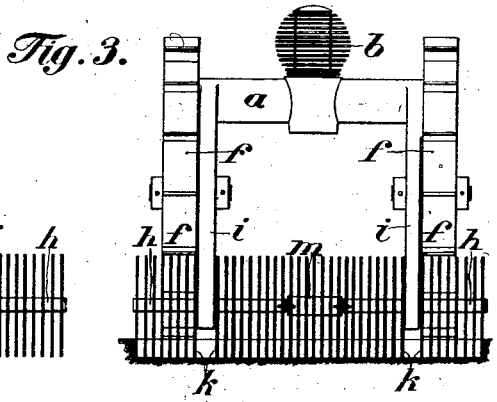
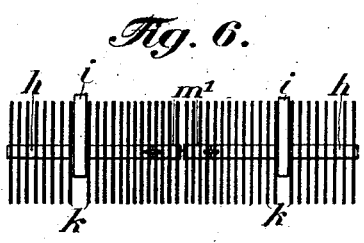
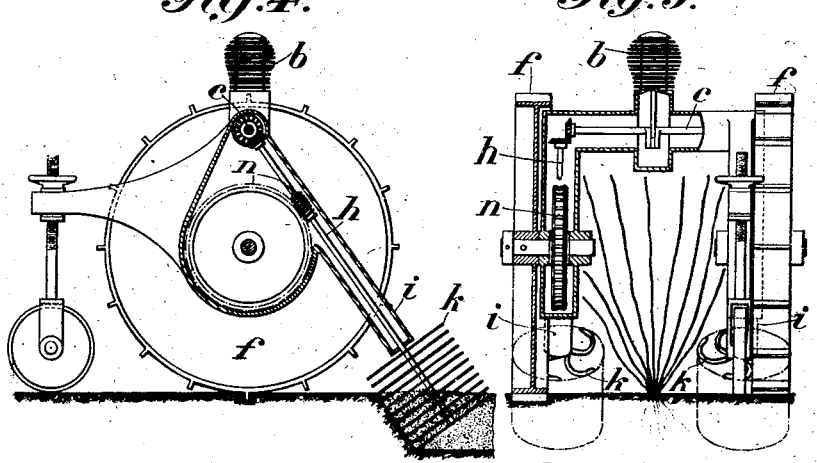
Inventor
K. von Meyenburg
by Langner, Parry, Card & Langner
Attys.

Patented Apr. 3, 1928.

1,664,789

UNITED STATES PATENT OFFICE.

KONRAD VON MEYENBURG, OF BASEL, SWITZERLAND.

MOTOR TILLING MACHINE.

Application filed December 1, 1925, Serial No. 72,549, and in Germany December 12, 1924.

The invention relates to a motor-driven tilling machine for tilling between rows of plants.

According to this invention, the improved machine comprises tilling shafts supported on a frame constructed as a driving gear box and adapted to extend over one or more rows of plants, in which the tilling shafts are mounted in arms integral with and extending downwards from the upper portion of the casing enclosing the driving gear, the driving and tilling gear thus being enclosed in a single self-contained rigid and compact casing constituting a forked frame for the machine as a whole, the arms of the fork extending downwards on each side of a row of plants.

The accompanying drawings show several embodiments of the subject of the present invention;

Fig. 1 is a longitudinal section, and

Fig. 2 a partial cross-section of one of these embodiments;

Fig. 3 shows another form of the machine, wherein the tilling shafts are connected together by an auxiliary tilling element so as to form a continuous rotary tiller;

Fig. 4 shows a modification thereof;

Fig. 5 is a longitudinal section and

Fig. 6 a partial cross-section through a further form of this machine.

As shown in Figs. 1 and 2, the machine comprises a hollow frame $a$ disposed transversely over a row of plants, a motor $b$ and a crank shaft $c$ driven thereby and enclosed within said frame, said shaft carrying on its ends pinions $d$ meshing with toothed gears $e$ to actuate the driving wheels $f$ of the machine and also, through the intermediary of a chain gear $g$ or the like, each of the horizontal tilling shafts $h$ extending over both sides of the row of plants. The tilling shafts $h$ are journaled in hollow tool-holding arms $i$, extending downwardly over both sides of the row of plants and cast together with the frame $a$, or otherwise rigidly fixed thereto, so as to constitute rigid housings integral with the frame $a$ and to thus form a yoke-like frame body.

The tilling shafts $h$, upon which the tilling tools or prongs $k$ are fixed, are located along the same transverse axis parallel to the motor crank shaft $c$, a sufficient distance being left between the adjacent ends of the shafts $h$ to permit the free passage of the machine over the rows of plants.

In the modification shown in Fig. 3, means are provided for coupling the tilling shafts $h$ together for plain not strip work. These means consist of an intermediate coupling member $m$ constructed as a tilling element and inserted between the shafts $h$, to which it is connected. In this way, there can be formed one single integral continuous tilling tool, supported and driven at several places.

In the case of Fig. 4, two additional independent tilling sections $m^1$ are inserted between the shafts $h$ and rigidly or loosely connected thereto respectively. With these independent sections, the tilling shafts $h$ need not be in line with one another, as they are not coupled together.

The length of the tilling shafts $h$ may be dependent on the distance of the adjacent rows of plants.

The relative position of the tilling shafts may also be different from the normal straight line arrangement for special purposes; for instance the tilling shafts can be inclined together in a horizontal plane, forwardly or rearwardly, or in a vertical plane, upwardly or downwardly.

Figs. 5 and 6 show another arrangement of the tilling shafts $h$. The shafts $h$ extend backwardly and downwardly within planes parallel to the driving wheels $f$ and the tilling tools are so arranged thereon as to move the earth to one side in order to earth up the plants. In the case shown, the driving wheels $f$ of the machine are driven by the tilling shafts $h$ themselves by means of worm gearing $n$.

It is not of any importance whether the operative portions of the tilling shafts are located in front of or behind the axis of the driving wheels of the machine, or whether they run forwards or in the reverse direction, and, furthermore, it is immaterial whether these operative portions run between, in front of, or behind the driving wheels.

In the case of the tilling shafts being arranged approximately parallel to the ground and transversely to the direction of travel of the machine, it is not essential that the axes of these shafts should be in alignment. The oblique position of the tilling shafts has been mentioned, but these shafts are however, preferably arranged so that, according to the width to be tilled between the rows of plants or before planting, it is possible, by inserting intermediate tilling members, to till a single strip of ground, the tilling shafts being preferably connected to the intermediate tilling members, in order to facilitate this operation.

What I claim is:—

1. In a motor tilling machine for tilling between rows of plants, a hollow main frame forming a gear casing, two hollow arms extending downwards from said frame on both sides of a row of plants and rigidly connected therewith so as to form with said frame a rigid yoke-like housing, two horizontal tilling shafts carried by said hollow arms and a gearing located within said arms to drive said shafts.

2. In a motor tilling machine for tilling between rows of plants, a hollow main frame forming a gear casing, two hollow arms extending downwards from said frame on both sides of a row of plants so as to form with said frame a rigid yoke-like housing, two horizontal tilling shafts carried by said hollow arms, a gearing located within said arms to drive said shafts and an additional intermediate tilling element adapted to be inserted between said tilling shafts and connected therewith.

In witness whereof I have hereunto signed my name this 19th day of November, 1925.

KONRAD von MEYENBURG.